(12) United States Patent
König et al.

(10) Patent No.: US 7,122,244 B2
(45) Date of Patent: Oct. 17, 2006

(54) POLYAMIDE-IMIDE RESIN SOLUTION AND THE USE THEREOF FOR PRODUCING WIRE ENAMELS

(75) Inventors: Sascha Tödter König, Hamburg (DE); Klaus Wilhelm Lienert, Hamburg (DE); Gerold Schmidt, Hamburg (DE)

(73) Assignee: Altana Electrical Insulation GmbH, Wesel (DE)

( * ) Notice: Subject to any disclaimer, the term of this patent is extended or adjusted under 35 U.S.C. 154(b) by 24 days.

(21) Appl. No.: 10/362,426

(22) PCT Filed: Aug. 27, 2001

(86) PCT No.: PCT/EP01/09841

§ 371 (c)(1),
(2), (4) Date: Jul. 14, 2003

(87) PCT Pub. No.: WO02/16476

PCT Pub. Date: Feb. 28, 2002

(65) Prior Publication Data

US 2004/0006174 A1    Jan. 8, 2004

(30) Foreign Application Priority Data

Aug. 25, 2000   (DE) ................................. 100 41 943

(51) Int. Cl.
*B05D 1/00*   (2006.01)
*C08L 79/08*  (2006.01)

(52) U.S. Cl. .................... 428/357; 427/220; 428/361; 428/364; 428/394; 428/395; 528/44; 528/67; 528/170; 528/176; 528/310; 528/322; 528/332; 528/353; 524/538

(58) Field of Classification Search ................ 528/170, 528/353, 44, 67, 310, 322, 332, 176; 428/357, 428/361, 364, 394, 395; 427/220; 524/538
See application file for complete search history.

(56) References Cited

U.S. PATENT DOCUMENTS

| | | | | |
|---|---|---|---|---|
| 3,554,984 A | | 1/1971 | George et al. | 525/417 |
| 4,294,952 A | | 10/1981 | Mukoyama et al. | 528/67 |
| 4,447,589 A | * | 5/1984 | Nishizawa et al. | 528/45 |
| 4,497,944 A | * | 2/1985 | Nishizawa et al. | 528/49 |
| 4,505,980 A | * | 3/1985 | Nishizawa et al. | 428/383 |
| 5,536,791 A | * | 7/1996 | Schink et al. | 525/417 |
| 6,074,757 A | * | 6/2000 | Lienert et al. | 428/473.5 |
| 6,316,046 B1 | * | 11/2001 | Liener et al. | 427/117 |
| 6,337,442 B1 | * | 1/2002 | Lienert et al. | 174/120 R |

FOREIGN PATENT DOCUMENTS

| | | |
|---|---|---|
| DE | 1 266 427 | 4/1968 |
| DE | 19 56 512 | 5/1971 |
| DE | 20 31 072 | 1/1972 |
| DE | 24 41 020 | 3/1976 |
| DE | 25 56 523 | 6/1977 |
| DE | 29 47 117 | 6/1980 |
| DE | 30 34 536 | 3/1982 |
| DE | 32 41 345 | 5/1983 |
| DE | EP 0 291 699 | 11/1988 |
| JP | 55-86812 | * 7/1980 |

OTHER PUBLICATIONS

PCT International Search Report.

* cited by examiner

*Primary Examiner*—Ana Woodward
(74) *Attorney, Agent, or Firm*—Friedrich Kueffner

(57) ABSTRACT

The present invention relates to a polyamideimide resin solution preparable by reacting (a) aromatic polycarboxylic acids and/or their anhydrides with (b) aromatic imide- and amide-forming components in cresol at temperatures above 170° C., to the use of this polyamideimide solution for the preparation of wire enamels, to the wire enamels in question, and to the enamelled wires coated therewith.

19 Claims, No Drawings

POLYAMIDE-IMIDE RESIN SOLUTION AND THE USE THEREOF FOR PRODUCING WIRE ENAMELS

This application is the National Phase of International Application PCT/EP01/09841, filed Aug. 27, 2001, and claims priority to German Application No. 100 41 943.7 filed Aug. 25, 2000.

The present invention relates to a novel polyamideimide resin solution and to its use to prepare novel wire enamels. The present invention additionally relates to a novel process for preparing the polyamideimide resin solution and the wire enamels. The invention relates, furthermore, to the wires coated with the novel wire enamels.

The use of polyamideimides in wire enamels is known and is described, for example, in U.S. Pat. No. 3,554,984, DE-A-24 41 020, DE-A-25 56 523, DE-A-12 66 427 and DE-A-19 56 512. The polyamideimides are prepared from polycarboxylic acids or their anhydrides, in which two carboxyl groups are positioned vicinally and which must at least possess one other functional group, and from polyamines having at least one primary amino group capable of imide formation. Instead of the amino group, an isocyanate group may be used to form the imide ring. The polyamideimides may also be obtained by reacting polyamides, polyisocyanates containing at least two NCO groups, and cyclic dicarboxylate anhydrides containing at least one further group capable of condensation or addition reaction.

Moreover, it is also possible to prepare the polyamideimides from diisocyanates or diamines and dicarboxylic acids, provided that one of the components already contains an imide group. For instance, in particular, it is possible first to react a tricarboxylic anhydride with a diprimary diamine to give the corresponding diimidocarboxylic acid, which then reacts with a diisocyanate to give the polyamideimide.

The products presently offered on the market are polyamideimide wire enamels which consist of purely aromatic binders, for example of the reaction product of trimellitic anhydride with 4,4'-diphenylmethane diisocyanate, and are in solution in N-methylpyrrolidone (NMP), in some cases extended with a hydrocarbon. NMP is an expensive solvent. Moreover, it responds poorly to additives which are used, for example, to enhance the levelling of wire enamels. NMP is also responsible for the high level of NO, emissions from coating plants equipped with a state of the art waste-air incinerator.

An optimum solvent without the abovementioned disadvantages of NMP is cresol. It has, however, been found that the NMP-soluble polyamideimides cannot be prepared, or are not soluble, in cresol. Although many attempts have been made to solve these problems, no satisfactory result has been achievable to date.

For example, DE 2 031 072 discloses how when two solutions each at 160° C. are mixed, one solution being that of trimellitic anhydride in cresol and the other that of 4,4'-diaminodiphenylmethane in cresol, a cresol-soluble polyamideimide is obtained by condensation at above 190° C. No data are given on the flexibility of films after curing. Moreover, the process of mixing two hot solutions is not particularly practical.

JP 7324 597 describes the preparation of high imide content, cresol-soluble polyamideimides by the reaction of trimellitic anhydride and benzophenonetetracarboxylic dianhydride with 4,4'-diphenylmethane diisocyanate in cresol at 200° C. The wires coated therewith possess good film hardness and a softening temperature of above 360° C. The use of benzo-phenonetetracarboxylic dianhydride in polyamideimides containing N-methylpyrrolidone is nonstandard.

JP 7852 544 describes the reaction of trimellitic anhydride with cresol to give the cresyl ester and its reaction with 4,4'-diaminodiphenylmethane to give a cresol-soluble polyamideimide. The copper wire enamel prepared therewith is said to have standard properties. The storage stability of the cresol-containing enamel points to the presence of an amount (not stated) of ester in the resin.

JP 7899 299 likewise describes the reaction of trimellitic anhydride with cresol to give the cresyl ester. This ester is reacted first with 4,4'-diphenylmethane diisocyanate and then with 4,4'-diaminodiphenylmethane to give a cresol-soluble polyamideimide. The copper wire enamel prepared therewith is said to have standard properties. Again, no details are given on the ester content of the resin.

In DE 30 34 536 and EP 0 291 699, for example, the polyamideimide is rendered soluble in cresol by modification with epsilon-caprolactam. This polyamideimide is no longer purely aromatic. It is known that the aliphatic chain in epsilon-caprolactam has an adverse effect on the tg delta and softening temperature of the cured wire enamels.

JP 48/32920 describes the use of 1,2,3,4-butanetetracarboxylic acid. By this means the binder becomes soluble in a mixture of NMP with cresol. The butane derivative, however, introduces aliphatic structures into the molecule that are detrimental to the properties of the cured wire enamels, and are therefore unwanted.

DE 32 41 345 describes the use of citric acid in the structure of polyamideimides; JP 73/117268 that of azelaic acid. The above comments apply here as well.

Accordingly, it is an object of the present invention to provide a novel polyamideimide resin solution and novel wire enamels which no longer have the abovementioned disadvantages but which instead display a profile of properties which matches, if not indeed exceeds, the profile of properties of the solutions of purely aromatic polyamideimide resins in NMP, and of the corresponding wire enamels, and which in particular features improved storage stability.

This object is achieved by the novel polyamideimide resin solution, preparable by reacting (a) aromatic polycarboxylic acids and/or their anhydrides with (b) aromatic imide- and amide-forming components having a functionality of more than two, preferably 2.1–3, in cresol.

In the light of the prior art it was unforeseeable that the inventive measure of heating the aromatic reactants (a) and (b) in cresol would lead to the desired success. Quite the opposite was true, since those skilled in the art made considerable effort to find aliphatic components, or to develop processes, which ensured cresol solubility, and accepted the associated disadvantages since there seemed no other way of solving the problem.

In accordance with the invention, polycarboxylic acids and/or polycarboxylic anhydrides (a) are used for the preparation of the novel polyamideimide resin solution. In accordance with the invention it is of advantage to use aromatic tricarboxylic acids (a1) and/or their anhydrides (a1). Preference is given to using aromatic tricarboxylic acids (a1) of the general formula I and/or their anhydrides (a1) of the general formula II.

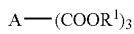 (I)

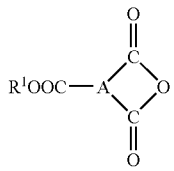 (II)

In the general formulae I and II, R¹ denotes a hydrogen atom.

A designates a group of the general formulae III to VI.

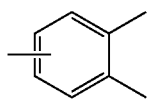 (III)

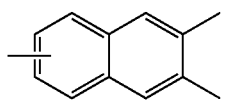 (IV)

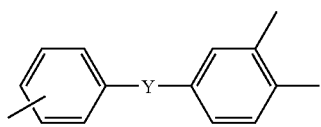 (V)

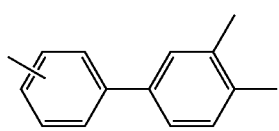 (VI)

In the general formula V, Y denotes a methylene, carbonyl, sulphone, dimethylmethylene, oxygen or sulphide bridge.

In accordance with the invention, groups of the general formulae III, IV, V, in which Y is a methylene bridge, and VI, but especially III, are preferred. Examples of components (a1) highly suitable in accordance with the invention, accordingly, are trimellitic acid and its anhydride, naphthalenetricarboxylic acid and its anhydride, and biphenyltricarboxylic acid and its anhydride. Very particular preference is given to using trimellitic anhydride. The components (a1) may be used individually or as mixtures.

Instead of the components (a1), it is possible to use their mixtures (a2) with aromatic tetracarboxylic acids (a21) and/or their anhydrides (a21). Examples of suitable components (a21) are benzophenonetetracarboxylic acid and its anhydride or pyromellitic acid and its anhydride.

Furthermore, instead of the components (a1) or of the mixtures (a2), it is possible to use mixtures (a3) which in addition to the component (a1) and, where appropriate, the components (a21) further comprise other aromatic dicarboxylic acids (a31). One example of a highly suitable aromatic dicarboxylic acid (a31) is terephthalic acid.

The further important starting compounds for the preparation of the polyamideimide solution of the invention are the imide- and amide-forming components (b). Their functionality is greater than two, preferably 2.1–3, most preferably 2.1–2.7.

As components (b) it is preferred to use polyisocyanates having a functionality greater than 2, preferably 2.1–3, most preferably from 2.1 to 2.7.

The polyisocyanates (b) may have the required functionality at the very time of their preparation. Alternatively, the functionality may be adjusted or varied by mixing at least one polyisocyanate with at least one other polyisocyanate, especially a diisocyanate.

Employed with particular preference in component b) are the components b1) to b3) described below:

Component b1

In the preparation of pure 4,4'-diphenylmethane diisocyanate a polyisocyanate based on 4,4'-diphenylmethane diisocyanate is obtained which in addition to the latter comprises isomers and homologues. In the text below, this mixture is referred to as oligomer mixture. The isocyanate oligomer mixture has, arithmetically, a functionality which is higher than two NCO groups per molecule. Preferred for this invention are products which have a functionality of between 2.1 and 2.7 per molecule. Where this functionality is higher, it may be adjusted by adding pure 4,4'-diphenylmethane diisocyanate. Commercial products consisting of this oligomer mixture are, for example, Desmodur® VL, Lupranat® M20S, Isonate® M305, and others. For the preparation of the novel polyamideimide resin solution from the oligomer mixtures, particular preference is given in accordance with the invention to Desmodur® VL, alone or blended with pure 4,4'-diphenylmethane diisocyanate.

Component b2

It is also possible to employ either polyisocyanates of the prepolymer type, obtained by reaction of a polyol with diisocyanates, or trimerized diisocyanates. Isocyanates of the prepolymer type are commercial products, e.g. Desmodur® L (from trimethylolpropane and 2,4/2,6-tolylene diisocyanate), Desmodur® AP stabil (like Desmodur® L, the isocyanate groups are blocked with phenol). Trimerized isocyanates contain an isocyanurate ring and three free or else blocked isocyanate groups. Commercial products are derived from 2,4/2,6-tolylene diisocyanate, from hexamethylene diisocyanate or from isophorone diisocyanate. Of the polyisocyanates, particular preference is given to Desmodur® CT stabil, a trimerized and phenol-blocked tolylene diisocyanate. For the preparation of the novel polyamideimide resin solution, particular preference is given in accordance with the invention to Desmodur® CT stabil in a blend with pure 4,4'-diphenylmethane diisocyanate.

Component b3

Suitable components b3 include aromatic polyisocyanates, especially aromatic diisocyanates

 A'-(NCO)₂ (VIII)

In the general formula VIII, A' denotes a group of the general formulae IX to XIII.

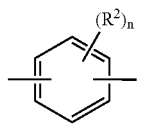 (IX)

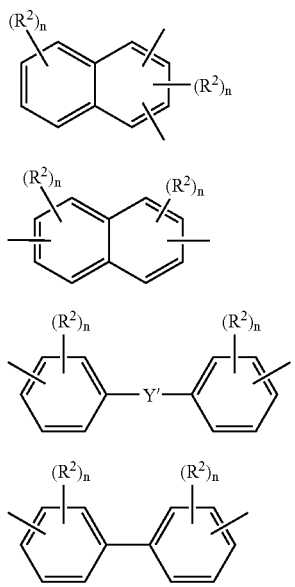

In the general formula XII, Y' has the definition indicated above for Y and additionally stands for 1,3,4-thiadiazole-2, 5-diyl. In the general formulae IX to XIII, $R^2$ denotes a $C_1$ to $C_4$ alkyl radical, especially methyl, or a phenyl radical. The index n is 0 or an integer from 1 to 4.

Examples of suitable aromatic diisocyanates are, for example, phenylene, tolylene, naphthalene or xylylene diisocyanates or diphenyl ether, diphenyl sulphide, diphenyl sulphone or diphenylmethane diisocyanate, especially 4,4'-diphenylmethane diisocyanate.

The component b1 may per se form component (b). In another variant of the invention, component b3 may be present either in a mixture with component b1) or in a mixture with component b2.

In other words, as component (b) it is possible to employ either
b1) aromatic polyisocyanates obtained in the preparation of 4,4'-diphenylmethane diisocyanate, consisting of a mixture of 4,4'-diphenylmethane diisocyanate, its isomers and homologues, having an arithmetic NCO functionality of from about 2.1 to 2.7 per molecule
or
b2) polyisocyanates either of the prepolymer type, obtained by reaction of a polyol with diisocyanates, or trimerized diisocyanates containing an isocyanurate ring and three free or else blocked isocyanate groups
in each case in a mixture with
b3) aromatic diisocyanates.

In accordance with the invention, for the preparation of the novel polyamideimide resin solution, the amounts of the above-described components (a) and (b) are chosen such that their equivalents ratio is approximately 1, preferably from 0.8 to 1.2, with particular preference from 0.9 to 1.1, and in particular 1.

The process of the invention for preparing the novel polyamideimide resins is conducted by reacting components (a) and (b) in cresol. In accordance with the invention the reaction temperature is more than 170° C. The temperature is preferably between 175 and 230° C., in particular between 180 and 210° C.

In the case of the reaction of components (a) with aromatic diisocyanates (b3), the course of the reaction can be followed easily from the amount of carbon dioxide formed. In accordance with the invention, an oligomer mixture is used in a blend with a pure isocyanate, or a diisocyanate in a mixture with a polyisocyanate. Where a blocked polyisocyanate is used, the blocking agent is eliminated during the reaction.

After the end of the reaction, the novel polyamideimide resin solution is adjusted to the desired coating viscosity by adding further cresol and/or extender. Moreover, conventional crosslinking catalysts and/or additives are generally added to the novel wire enamel.

Preferably, the novel wire enamel comprises the novel polyamideimide resin solution and the other constituents in an amount such as to result in the following composition:

from 10 to 50% by weight, preferably from 15 to 45% by weight of polyamideimide from 0.1 to 5.0% by weight, preferably from 0.1 to 4.0% by weight, of additives from 0.0 to 5.0% by weight, preferably from 0.0 to 3.0% by weight, of crosslinking catalysts from 10 to 90% by weight, preferably from 20 to 80% by weight, of cresol from 0 to 40% by weight, preferably from 5 to 35% by weight, of extenders the percentages by weight being based in each case on the novel wire enamel and always adding up to 100% by weight.

Advantageously, the polyamideimides include phenolic resins or melamine resins as additives as well. Additives which have likewise proven to be appropriate are commercially customary fluorinated additives or else relatively high-boiling alcohols, such as benzyl alcohol, for example.

As crosslinking catalysts it is possible to use the catalysts customary in wire enamel technology. Examples of suitable catalysts are zinc octoate, cadmium octoate, or titanates, such as tetrabutyl titanate.

Examples of suitable extenders are xylene, Solventnaphtha®, toluene, ethylbenzene, cumene, heavy benzene, various Solvesso® and Shellsol grades, and Deasol®.

The pattern of properties of the novel polyamideimide resin solution prepared in accordance with the process of the invention corresponds, surprisingly, to that of the NMP-containing polyamideimides. The novel wire enamels prepared using the novel polyamideimide resin solution are stable on storage. They possess good adhesion to copper wires and to the commonly used, polyester- or polyesterimide-based basecoats. They have a high softening temperature and heat shock.

The novel wire enamels obtained by the process of the invention are used to coat wires. They are preferably applied to copper wires as topcoats, over polyester basecoats, and are baked. The preferred field of use likewise includes, however, their use as single coat materials. The present invention accordingly also provides for this use of the novel wire enamels.

The invention likewise provides wires coated with the novel wire enamel. Surprisingly, there is no difference between the level of properties of these wires and that of wires enamelled using NMP-containing wire enamels.

The invention is illustrated by the following examples.

EXAMPLE 1

Inventive Preparation of the Novel Polyamideimide Resin Solution 1 and of the Novel Wire Enamel 1

537 g of trimellitic anhydride, 1 270 g of cresol and 750 g of Desmodur® VL are heated to 80° C. in a three-necked flask. After the exotherm, the mixture is slowly heated to 190° C. After the formation of $CO_2$ has ended, the batch is held at 190° C. for 2 hours. Then the polyamideimide resin solution 1 is cooled. 1 270 g of cresol, 760 g of a 1:1 cresol:xylene mixture and 20 g of benzyl alcohol are added. The viscosity is adjusted to 780 mPas/23° C. using 1:1 cresol-xylene. The solids content is 27.7% (1 g/1h/180° C.).

EXAMPLE 2

Inventive Preparation of the Novel Polyamideimide Resin Solution 2 and of the Novel Wire Enamel 2

404.6 g of trimellitic anhydride, 400.0 g of 4,4'-diphenyl-methane diisocyanate, 136.0 g of Desmodur® VL, 914.0 g of cresol and 9 g of imidazole are heated to. 150° C. in a three-necked flask, held for 1 hour and slowly heated to 210° C. After 3 hours at 210° C. the polyamideimide resin solution 2 is diluted with 614.0 g of cresol and 765.0 g of Solventnaphtha® and cooled. Thereafter, 75 g of benzyl alcohol, 600.0 g of cresol and 200.0 g of Solventnaphtha® are added. Adjustment to 1 000 mPas/23° C. is made using a 3:1 cresol:Solvent-naphtha mixture. The solids content was 21.0% (1 g/1h/180° C.).

EXAMPLE 3

Inventive Preparation of the Novel Polyamideimide Resin Solution 3 and of the Novel Wire Enamel 3

576.0 g of trimellitic anhydride, 500.0 g of 4,4'-diphenyl-methane diisocyanate, 268.0 g of Desmodur® VL, 1 320.0 g of cresol and 6.0 g of imidazole are heated in stages to 210° C. in a three-necked flask. The resulting polyamide-imide resin solution 3 is diluted with 1 110.0 g of cresol and 810.0 g of Solvesso® 100. 53.8 g of benzyl alcohol and 700.0 g of a 2:1 cresol:Solvesso® diluent. The resulting wire enamel 3 is adjusted to a viscosity of 840 mPas at 23° C. and a solids content of 23.4% (1 g/1 h/180° C.) using the 2:1 cresol:Solvesso® mixture.

EXAMPLE 4

Inventive Preparation of the Novel Polyamideimide Resin Solution 4 and of a Novel Wire Enamel 4

384.0 g of trimellitic anhydride, 250.0 g of 4,4'-diphenyl-methane diisocyanate, 268.0 g of Desmodur® VL, 900.0 g of cresol and 7.0 g of imidazole are slowly heated to 210° C. in a three-necked flask. The contents of the flask are held at this temperature for 1 hour. The resulting polyamideimide resin solution 4 is cooled and then diluted with 790.0 g of cresol and 846.0 g of Solvesso® 100. Following the addition of 28.0 g of benzyl alcohol, 45.0 g of cresol and 15.0 g of Solvesso® 100, the resulting wire enamel 4 is adjusted to a viscosity of 980 mPas at 23° C. and a solids content of 25.9% (1 g/1 h/180° C.).

EXAMPLE 5

Inventive Preparation of the Novel Polyamideimide Resin Solution 5 and of the Novel Wire Enamel 5

224.2 g of trimellitic anhydride, 250.0 g of 4,4'-diphenyl-methane diisocyanate, 90.0 g of Desmodur® CT stabil, 564.0 g of cresol and 2.5 g of imidazole are slowly heated to 210° C. in a three-necked flask. The contents of the flask are held at this temperature for 10 hours. The resulting polyamideimide resin solution 5 is cooled and then diluted with 300.0 g of cresol and 300.0 g of Solventnaphtha®. Following the addition of 42.0 g of benzyl alcohol, 200.0 g of cresol and 100.0 g of Solventnaphtha®, the resulting wire enamel 5 is adjusted to a viscosity of 840 mPas at 23° C. and a solids content of 17.5% (1 g/1 h/180° C.) using a 2:1 cresol:Solventnaphtha mixture.

Comparative Example 1

Preparation of a Conventional Polyamideimide Resin Solution C1 and of a Conventional Wire Enamel C1

At a temperature of less than 30° C., 38.5 g of trimellitic anhydride, 60.0 g of 4,4'-diphenylmethane-diisocyanate and 73.5 g of N-methylpyrrolidone are mixed with one another. The mixture is heated to 150° C. at a rate of 10° C. per hour. The batch is held at this temperature until carbon dioxide is no longer formed. The resulting polyamideimide resin solution C1 is diluted with 93 g of N-methylpyrrolidone and 50.1 g of xylene. The resulting wire enamel C1 has a solids content of 30% with a viscosity of 230 mPas at 23° C.

Comparative Example 2

Attempt to Prepare a Conventional Polyamideimide Resin Solution C2 and a Conventional Wire Enamel C2

537 g of trimellitic anhydride, 1 270 g of cresol and 700.0 g of 4,4'-diphenylmethane diisocyanate are heated to 80° C. in a three-necked flask. After the exotherm, the mixture is slowly heated to 210° C. After the end of formation of $CO_2$, the batch is held at 210° C. for 3 hours. The polyamide resin solution is then cooled. The enamel is not stable. A precipitate is formed after a short time.

Use examples 1 to 5 and C1:

Enamelling and Performance Testing

The wire enamels 1 to 5 and C1 were applied conventionally using wire enamelling machines, and cured. They were applied as usual as topcoats over a polyester or polyesterimide basecoat. The enamel film thickness required in each case was built up by a number of individual applications, each individual application of enamel being cured without blisters before the next application of enamel. The customary enamelling machines used operated with take-off speeds of from 5 up to 180 m/min, depending on the thickness of the wire to be coated. For curing, the oven temperatures were, as usual, at 520° C. Table 1 gives an overview of the enamelling conditions employed.

Table 1

Enamelling Conditions: Two-coat Systems with Polyester Enamel (PE) or Polyesterimide (PEI) Plus Inventive Wire Enamel

| Oven: | NAG AW/1A from NAG, Graz, Austria |
|---|---|
| Temperature: | 520° C. |
| Application system: | nozzles |
| Wire diameter: | 1.00 mm |
| Take-off speed: | 17 m/min |
| Number of passes: | |
| Basecoat | 8 |
| Topcoat | 2 |
| Degree of increase: | 2 L |

The enamelled wires are tested in accordance with IEC 851 (International Electronic Commission—IEC—standard 851). Table 2 summarizes the test results obtained.

TABLE 2

Test results to IEC 851

| Basecoat | PE | PE | PE | PE | PE | PEI | PE | PEI |
|---|---|---|---|---|---|---|---|---|
| Topcoat | 1 | 2 | 3 | 4 | 5 | 3 | C1 | C1 |
| Surface | sat. | sat. | sat. | sat. | sat. | sat. | sat. | sat. |
| Outer-fibre extension 1 * d + x% | 10 | 10 | 10 | 10 | 10 | 10 | 10 | 10 |
| Peel test (revolutions) | 168 | 183 | 168 | 182 | 192 | 170 | 135 | 139 |
| Heat shock 2 * d at 240° C. | sat. | sat. | sat. | sat. | sat. | | sat. | |
| Heat shock 2 * d at 250° C. | | | | | | sat. | | sat. |
| Softening temperature SET 0002 PCT ° C. | 350 | 350 | 350 | 350 | 350 | 350 | 350 | 350 |
| tg steep increase ° C. | 144 | 142 | 144 | 142 | 143 | 182 | 138 | 177 |

The results provide emphasis that the inventive wire enamels 1 to 5 have at least the profile of properties of the wire enamel C1.

The invention claimed is:

1. Polyamideimide resin solution prepared by reacting components consisting essentially of
  (a) aromatic polycarboxylic acids and/or their anhydrides with
  (b) aromatic imide- and amide-forming components having a functionality of greater than two,
in cresol at temperatures above 1700 C.

2. Polyamideimide resin solution according to claim 1, wherein component (a) is selected from the group consisting of aromatic tricarboxylic acids of the general formula I and/or their anhydrides of the general formula II; aromatic tetracarboxylic acids and/or their anhydrides; aromatic dicarboxylic acids; and mixtures thereof:
wherein formula I and formula II are set forth below:

$$A-(COOR^1)_3 \quad (I)$$

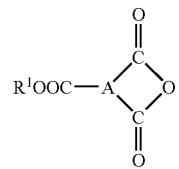

in which
R$^1$=H and
A=a group of the general formula III to VI

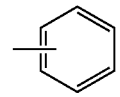

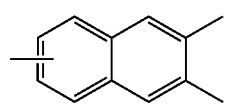

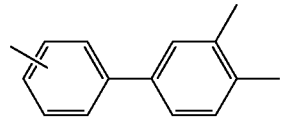

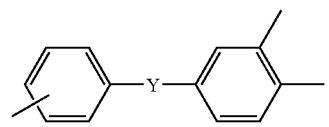

wherein Y=—CH2—, —CO—, —SO$_2$—, —C(CH$_3$)$_2$—, —O— or —S—.

3. Polyamideimide resin solution according to claim 2, wherein
  the tricarboxylic acids and/or their anhydrides thereof comprise trimellitic acid and/or its anhydride;
  the tetracarboxylic acids and/or their anhydrides thereof comprise benzophenone-tetracarboxylic acid, pyromellitic acid and/or their anhydrides; and
  the dicarboxylic acids comprise terephthalic acid.

4. Polyamideimide resin solution according to claim 1 wherein polyisocyanates are used as component b).

5. Polyamideimide resin solution according to claim 4, wherein the polyisocyanates (b) having the required functionality are prepared by mixing at least one polyisocyanate and at least one other polyisocyanate.

6. Polyamideimide resin solution of claim 5, wherein component b) comprises diisocyanate compounds of the general formula $$A'\text{-}(NCO)_2 \quad (VIII),$$

where A'=a group of the general formula IX to XIII

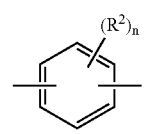

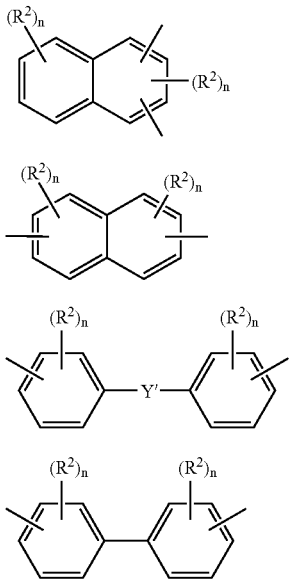

wherein Y' has the above-indicated meaning of Y and additionally denotes 1,3,4-thiadiazole-2,5-diyl,
$R^2 = C_1$ to $C_4$ alkyl or phenyl and
n=0 or an integer from 1 to 6.

7. Polyamideimide resin solution according to claim 6, wherein component b) comprises a diisocyanate selected from the group consisting of phenylene, tolylene, naphthalene, xylylene, diphenyl ether, diphenyl sulphide, diphenyl sulphone, and diphenylmethane diisocyanates.

8. Polyamideimide resin solution according to claim 4 wherein the polyisocyanates comprise a mixture of 4,4'-diphenylmethane diisocyanate, its isomers and homologues, having an arithmetic NCO functionality of from about 2.1 to 2.7 per molecule.

9. Polyamideimide resin solution according to claim 4, wherein the component b) comprises a mixture of polyisocyanates derived from a prepolymer, obtained by reaction of a polyol with diisocyanates, or trimerized diisocyanates containing an isocyanurate ring and three free or else blocked isocyanate groups and aromatic diisocyanates.

10. Wire enamel comprising the polyamideimide resin solution of claim 1.

11. Wire enamel according to claim 10, wherein said wire enamel further comprises additives and/or extenders.

12. Wire enamel according to claim 10, comprising the polyamideimide resin solution in an amount such that, based on the total amount of the wire enamel, the resulting polyamideimide content is from 10 to 50% by weight.

13. Wire enamel according to claim 12, comprising, based on the total amount of the wire enamel, from 10 to 50% by weight of polyamideimide
from 0.1 to 5.0% by weight of additives
from 0.0 to 5.0% by weight of crosslinking catalysts
from 10 to 90% by weight of cresol
from 0 to 40% by weight of extenders.

14. Enamelled wire coated with a wire enamel according to claim 10.

15. Process for producing an enamelled wire comprising
applying a basecoat to a wire,
applying the wire enamel of claim 10, onto the basecoat, and
baking the wire enamel.

16. A process comprising coating a wire with the wire enamel of claim 10.

17. A coated wire obtained by the process of claim 16.

18. The coated wire of claim 17, wherein said wire comprises said wire enamel as a single coat.

19. The coated wire of claim 17, wherein said wire comprises said wire enamel as a top coat.

* * * * *